US006527838B2

United States Patent
Volo et al.

(10) Patent No.: US 6,527,838 B2
(45) Date of Patent: Mar. 4, 2003

(54) INDOOR FAN FILTER

(76) Inventors: Giovanni D. Volo, 13 Willis Ave., Meriden, CT (US) 06450; Salvatore R. Carabetta, 2209 N. Broad St., Meriden, CT (US) 06450

( * ) Notice: Subject to any disclaimer, the term of this patent is extended or adjusted under 35 U.S.C. 154(b) by 0 days.

(21) Appl. No.: 09/903,626

(22) Filed: Jul. 13, 2001

(65) Prior Publication Data

US 2002/0007735 A1 Jan. 24, 2002

Related U.S. Application Data

(60) Provisional application No. 60/218,826, filed on Jul. 18, 2000.

(51) Int. Cl.[7] .............................................. B01D 46/10
(52) U.S. Cl. ............................. 96/134; 55/471; 55/496; 55/497; 55/506
(58) Field of Search ................................ 96/134; 55/315, 55/467, 471, 472, 490, 495, 496, 497, 504, 506, 511

(56) References Cited

U.S. PATENT DOCUMENTS

| | | | | |
|---|---|---|---|---|
| 2,992,701 A | * | 7/1961 | White ..................... 415/121.2 |
| 3,523,409 A | * | 8/1970 | Paterson ...................... 55/471 |
| 3,577,710 A | * | 5/1971 | Feldman ...................... 55/318 |
| 3,740,934 A | * | 6/1973 | Shuler ......................... 454/284 |
| 3,802,168 A | * | 4/1974 | Deckas ........................ 454/230 |
| 3,999,969 A | * | 12/1976 | Shuler ......................... 55/418 |
| 4,477,272 A | | 10/1984 | Hollis et al. ................. 55/509 |
| 4,781,526 A | | 11/1988 | Mead .......................... 55/501 |
| 5,462,569 A | * | 10/1995 | Benjamin .................. 55/385.6 |
| 5,525,145 A | | 6/1996 | Hodge ........................ 55/516 |
| 5,529,593 A | | 6/1996 | Simmons ..................... 55/471 |
| 5,573,563 A | | 11/1996 | Odom et al. .................. 55/471 |
| 5,690,719 A | | 11/1997 | Hodge ......................... 55/504 |
| 5,762,665 A | * | 6/1998 | Abrahamian et al. ...... 55/385.1 |
| 5,868,189 A | | 2/1999 | Jarvis ......................... 150/165 |
| D408,513 S | | 4/1999 | Reede |
| 5,904,744 A | | 5/1999 | Kagan ....................... 55/385.1 |
| D420,117 S | | 2/2000 | Gieseke et al. |
| 6,030,427 A | | 2/2000 | Sorice et al. ................. 55/480 |
| 6,045,329 A | | 4/2000 | Sobala ................... 416/146 R |
| 6,156,089 A | * | 12/2000 | Stemmer et al. ............. 55/467 |
| 6,174,340 B1 | * | 1/2001 | Hodge ....................... 55/385.1 |
| 6,264,727 B1 | * | 7/2001 | Elmore ........................ 55/357 |

FOREIGN PATENT DOCUMENTS

| WO | WO 97/10479 | 3/1997 |
|---|---|---|
| WO | WO 00/00775 | 1/2000 |

* cited by examiner

*Primary Examiner*—David A. Simmons
*Assistant Examiner*—Frank M. Lawrence
(74) *Attorney, Agent, or Firm*—Richard C. Litman

(57) ABSTRACT

One or two filters in brackets are integrated with a square or circular fan. Filters and associated brackets are provided both in the front and in the rear of the fan in one embodiment. In another embodiment, a single filter in a bracket is provided at the rear of the fan. The filter(s) can be pre-pleated and pre-activated carbon filter(s). The fan housing can include a pocket for adding an odorizing and/or deodorizing agent. A plurality of stick-on right-angled brackets having the capacity of adjustable clearance to snugly hold the filters is another embodiment.

7 Claims, 6 Drawing Sheets

INDOOR FAN FILTER

CROSS-REFERENCE TO RELATED APPLICATION

This application claims the benefit of U.S. Provisional Patent Application Ser. No. 60/218,826, filed Jul. 18, 2000.

BACKGROUND OF THE INVENTION

1. Field of the Invention

The present invention relates generally to fan filters. More specifically, the invention is the addition of one or two filters in bracket frames, stick-on brackets or clips integrated with a square or circular fan and having a side pocket for elements to odorize or eliminate odors. The filter(s) can include a pre-pleated charcoal element. A 24 hour and 7 day programmable timer can be added to the line cord.

2. Description of Related Art

The related art of interest describes various fan filters, but none discloses the present invention. There is a need for an effective and economical fan filter for especially square framed fans which can be readily replaced in added frames or held to the frame by stick-on brackets or clips. The related art will be discussed in the order of perceived relevance to the present invention.

U.S. Pat. No. 4,781,526 issued on Nov. 1, 1988, for Clarence Mead describes a fan-filter combination comprising a filter affixed to the rear of a fan unit by a parallel bracketing structure (screwed on) into which the filter is slidingly receivable from either above or below because the parallel brackets are several inches short of the top and bottom of the fan unit. The 20 inch square furnace filter has two perforated metal sheets and a cardboard frame supporting the filter sheet. A first embodiment consists of two parallel U-shaped brackets. A second embodiment consists of integrating the grille and brackets. A third embodiment consists of a separate metal frame with leg portions integrated with the fan unit by screws. The fan-filter combination is distinguishable for relying on its limited bracket coverage and the use of filters with double metal sheets.

U.S. Pat. No. 6,045,329 issued on Apr. 4, 2000, for Randy Sobala describes a fan filter for the rear and sides of a circular or square fan comprising a stretchable polypropylene fabric having two central openings for attachment by hook and loop fastening. The fan filter is distinguishable for lacking a rigid frame.

U.S. Pat. No. 6,030,427 issued on Feb. 29, 2000, for James Sorice et al. describes a replaceable air filter apparatus comprising a frame for affixing the apparatus to a house duct work associated with the heating and/or air conditioning system. A register is hinged to insert the filter. The air filter apparatus is distinguishable for being limited to a house duct work and requiring a hinged register.

P.C.T. Patent Application No. WO 00/00775 published on Jan. 6, 2000, for Toshio Tanaka et al. describes a local cleaning type air cleaner comprising a wall installed circular fan having an air filter. The air cleaner device is distinguishable for requiring a grill in front of the filter inlaid in a casing.

U.S. Pat. No. 5,690,719 issued on Nov. 25, 1997, for Joseph Hodge describes a filter apparatus for a forced air system duct containing a self-charging electrostatic filter layer and a second activated charcoal filter layer behind a grill. The filters are made of woven polypropylene material. The wall mount has a supporting frame and a securing lock. The filter apparatus is distinguishable for being located remotely from the fan.

U.S. Pat. No. 5,573,563 issued on Nov. 12, 1996, for Horace L. Odom et al. describes a micro-rotary screener apparatus comprising a multi-blade rotating air lock within a cylindrical shell having two screens attached directly to the odd numbered blades. The first screen is fine mesh stainless steel. The second screen has a larger mesh size. The particles from the screens are collected in a bin adjacent the screens. The apparatus is distinguishable for requiring two stainless steel mesh screens and a collection box.

U.S. Pat. No. 5,525,145 issued on Jun. 11, 1996, for Joseph Hodge describes a filtering apparatus for a forced air duct grill comprising a self charging electrostatic filter magnetically attachable directly in front of a grill at an end of a cold air return or supply of a forced air system. Two open work plates which can be decorated are positioned on either side of the filter. The filtering apparatus is distinguishable for requiring the two open work plates and an electrostatic filter.

U.S. Pat. No. 5,529,593 issued on Jun. 25, 1996, for Jesse K. Simmons describes a filter screen assembly for use with an air intake unit comprising a flexible screen provided as a roll wound onto a spindle. The filter screen assembly is distinguishable for its wound roll feature.

U.S. Pat. No. 4,477,272 issued on Oct. 16, 1984, for Craig E. Hollis et al. describes a soft and pliable circular fan filter mounted on the rear side of the cage of a household fan by two sets of drawstrings. The fan filter is distinguishable for its attachment to the fan by drawstrings.

U.S. Design Pat. No. 420,117 issued on Feb. 1, 2000, for Steven S. Gieseke et al. describes a circular ornamental coalescer filter having an off-center circular grille mounted on a rear plate having a top brace and a pair of canted feet. The device is distinguishable for its asymmetrical filter.

U.S. Design Pat. No. 408,513 issued on Apr. 20, 1999, for Dwayne E. Reede describes a filter with a central aperture for a round fan attachable to the front of the fan with a fold over element. The filter is distinguishable for wrapping around the front of a round fan.

U.S. Pat. No. 5,904,744 issued on May 18, 1999, for Anton Kagan describes a peripheral fan filter for reducing vibration of round fans such as ceiling fans, diffusers and other conventional round fans. The filter has four hook and loop fastening regions around the periphery with three of them involving a hook-threaded sheet and pawl teeth. The fan filter is distinguishable for its peripheral attachment with various elements.

U.S. Pat. No. 5,868,189 issued on Feb. 9, 1999, for Robin A. Jarvis describes a protective storage cover for a portable circular electric fan. The cover for the grille has snaps or two-way zippers for attachment and removal. The cover is distinguishable for its storage feature and fasteners.

P.C.T. Patent Application No. WO 97/10479 published on Mar. 20, 1997, for David A. West describes a fan air filter screen for a circular fan having a filter guard shaped as a split doughnut with openings in front and the rear and tied together on the fan guard. The device is distinguishable for its split doughnut structure.

None of the above inventions and patents, taken either singly or in combination, is seen to describe the instant invention as claimed.

SUMMARY OF THE INVENTION

The invention is directed to the addition of one or two thick filters in integral or removably affixed brackets or clips to either a square or circular fan. The invention includes one filter in the rear in one embodiment, and in a second embodiment two filters, one in the front and one in the rear. A side pocket for adding agents to odorize or eliminate odors is added on one bracket. The filter(s) can include a pleated pre-activated charcoal element.

Accordingly, it is a principal object of the invention to provide at least one filter for integration with a square or circular fan.

It is another object of the invention to provide front and rear brackets for a square fan to attach two filters.

It is a further object of the invention to provide a front and/or a rear bracket for a square fan having a pocket for inserting a deodorizing or odorizing agents.

Still another object of the invention is to provide a fan with an activated charcoal filter.

Yet another object of the invention to provide a plurality of stick-on brackets or clips to hold an air filter adjacent an indoor fan.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a fan filter system for square or round indoor fans comprising a square or round fan having a housing with front and rear sides.

Figure 1:
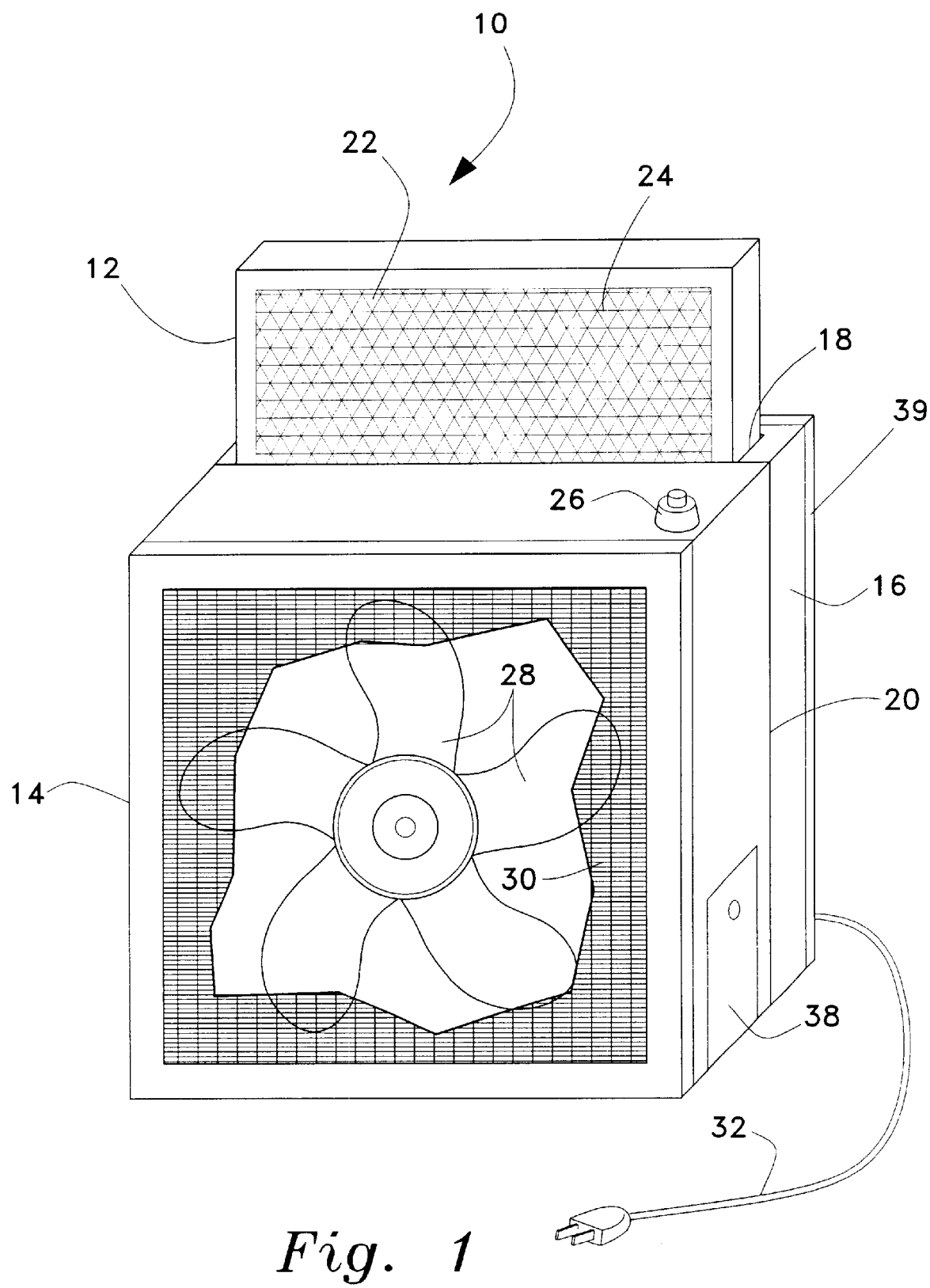
FIG. 1 is a perspective view of an indoor square fan with a rear filter partially exposed from its bracket and having a side pocket for adding odorizing or deodorizing agents according to a first embodiment of the present invention.

In FIG. 1, a first embodiment 10 is shown for attaching a single filter 12 to the rear of the box fan 14 in a peripheral metal or plastic bracket 16. The bracket 16 has a top opening 18 and a central opening (hidden) for passage of the effluent air for attachment to the rear side 20 between the rear grill 39 and the body of the box fan 14. A thick square filter sheet 22 supported by a cardboard or plastic frame is inserted in the bracket 16. The filter sheet 22 may include, but is not limited to, filter media of spun glass fiber, a charcoal filter having a porous media impregnated with activated charcoal, or a pre-pleated and pre-activated carbon filter for removing cigarette smoke, strong acids and strong bases, and dust. The filter sheet 22 can have a supporting plastic or metal grid 24 on one or both sides of the thick filter sheet 22. The filter sheet 22 can be 1 to 2 inches thick. When the filter 12 becomes fouled with contaminants, it can be washed and replaced in the bracket 16. A side pocket or drawer 38 (FIG. 1) in the frame of the box fan 14 is provided for adding an odorizing or deodorizing agent. Other structural parts of the depicted fan 14 are the on/off push button and speed regulator switch 26, the fan blades 28, the front grill 30, and the electric cord and plug 32.

It is to be noted that a circular fan is not shown, but can have a circular bracket with an apertured and split filter for attachment to the rear surface of the grid cage by hook and loop fastening and the like or can be made integral during manufacture.

Figure 2:
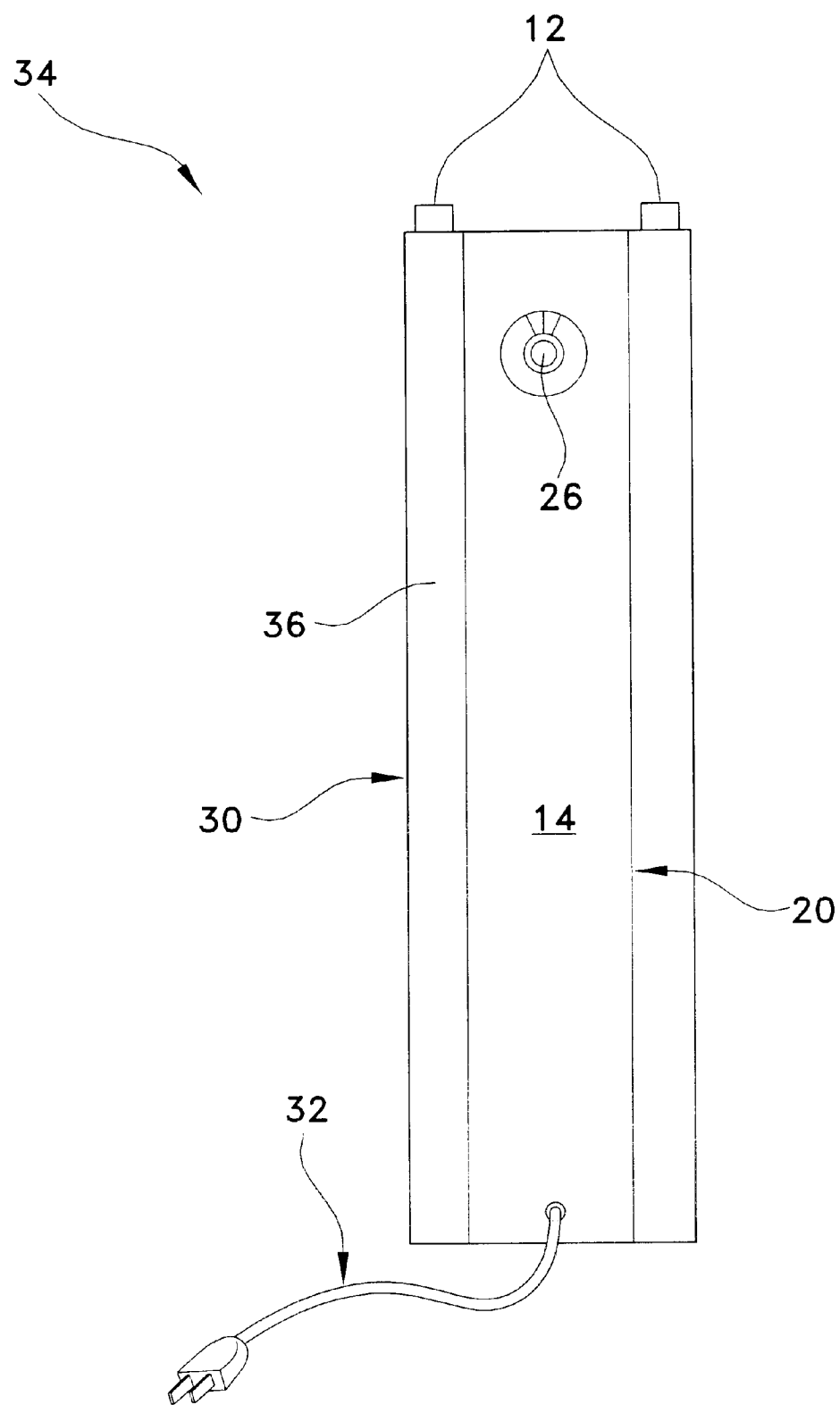
FIG. 2 is a side elevational view of an indoor square fan with filters on both sides in brackets and a front fan grill according to a second embodiment of the present invention.

In FIG. 2, a second embodiment fan 34 is illustrated in a side view to include a second peripheral and apertured bracket 36 and filter 12 between the front grill 30 and the body of the fan 34. Thus, a construction is shown with filters for both sides of the fan. The construction is particularly useful with bidirectional fans.

Figure 3:
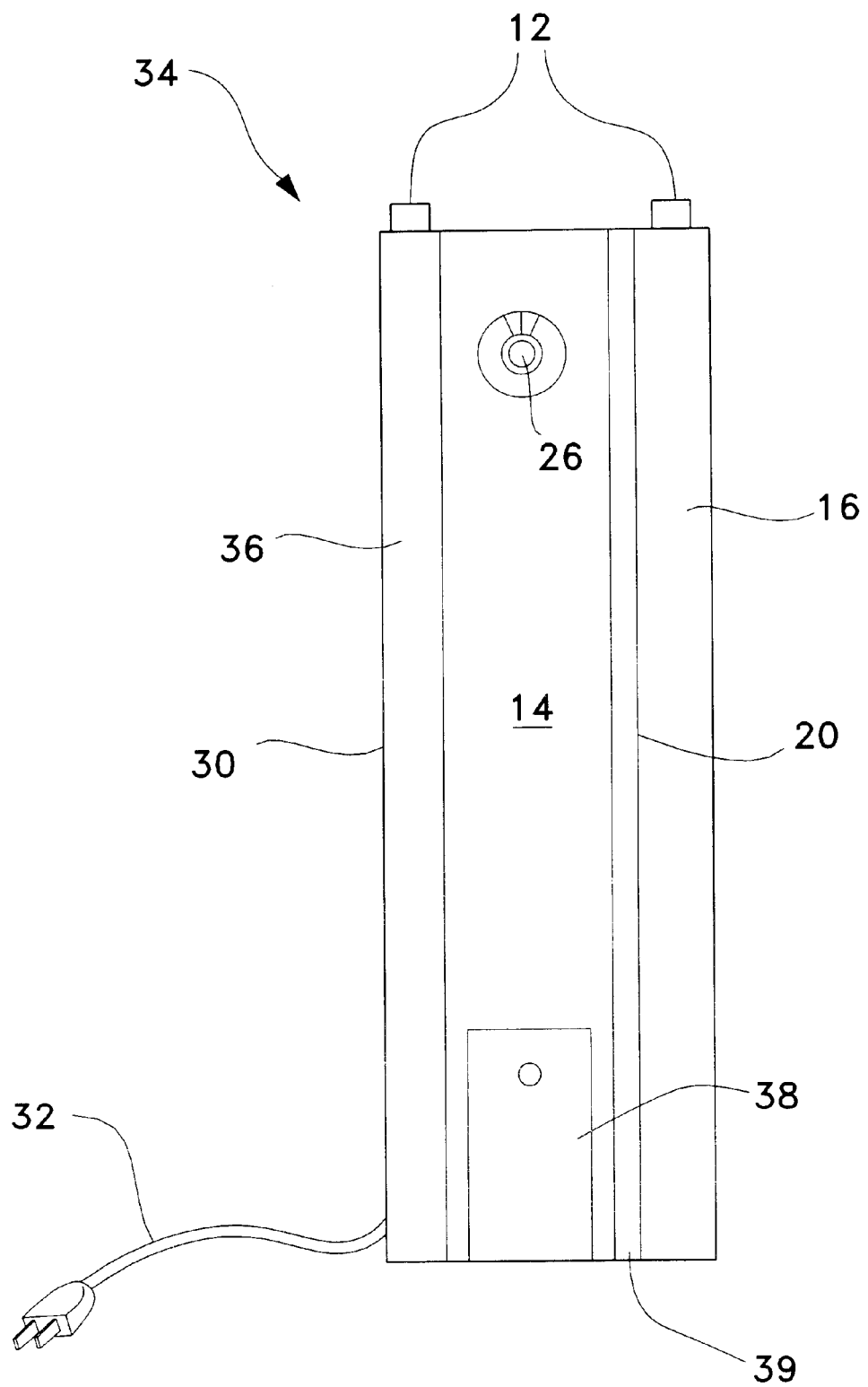
FIG. 3 is a side elevational view of an indoor square fan with filters on both sides in brackets and a rear fan grill positioned between the rear filter and the fan housing according to a third embodiment of the present invention.

In FIG. 3, a third embodiment fan 35 includes the front bracket 36 and filter 12 between the front grill 30 and the body of the box fan 14 and the addition of the rear bracket 16 to the rear fan grill 39. The side pocket or drawer 38 and the on/off switch and speed control 26 are included.

Figure 4:
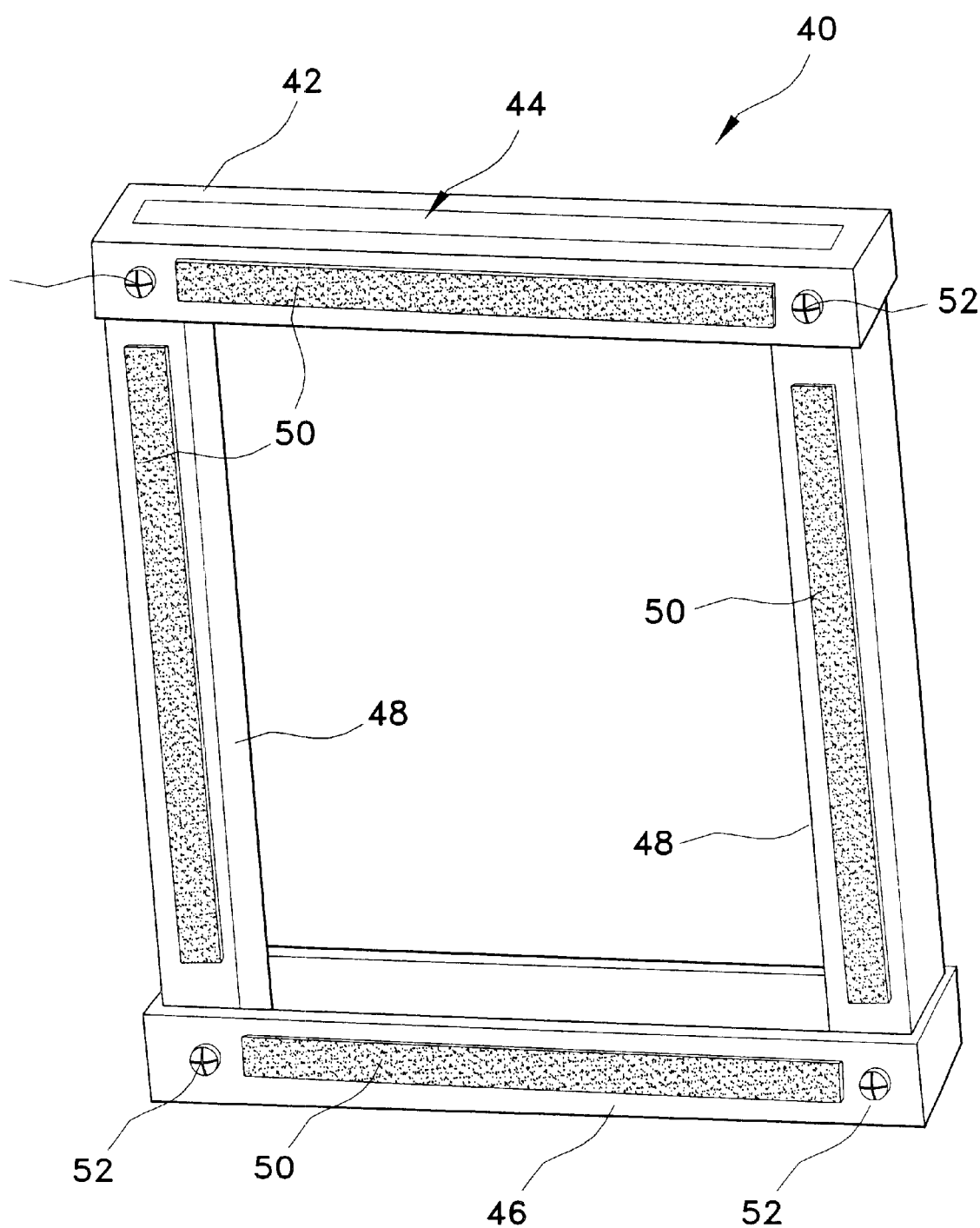
FIG. 4 is a front perspective view of a filter bracket having hook or loop fastening strips for attachment to a fan housing equipped with loop or hook fastening strips as a fourth embodiment of the present invention.

In FIG. 4, a fourth embodiment bracket 40 is shown fabricated by a top channel piece 42 having a slot 44, a bottom channel piece 46, and two channel side pieces 48 joined by fasteners 52 and having four hook or loop fastening strips 50 on the aforementioned channel pieces. Cooperating loop or hook fastening strips 50 would be attached to the body of the box fan 14. In the alternative, clips (not shown) can be used in place of the hook and fastening strips 50. Thus, it has been shown that the bracket 16 in FIGS. 1 to 3 can be fastened by screws or hook and loop strips 50 to the box fan 14.

Figure 5:
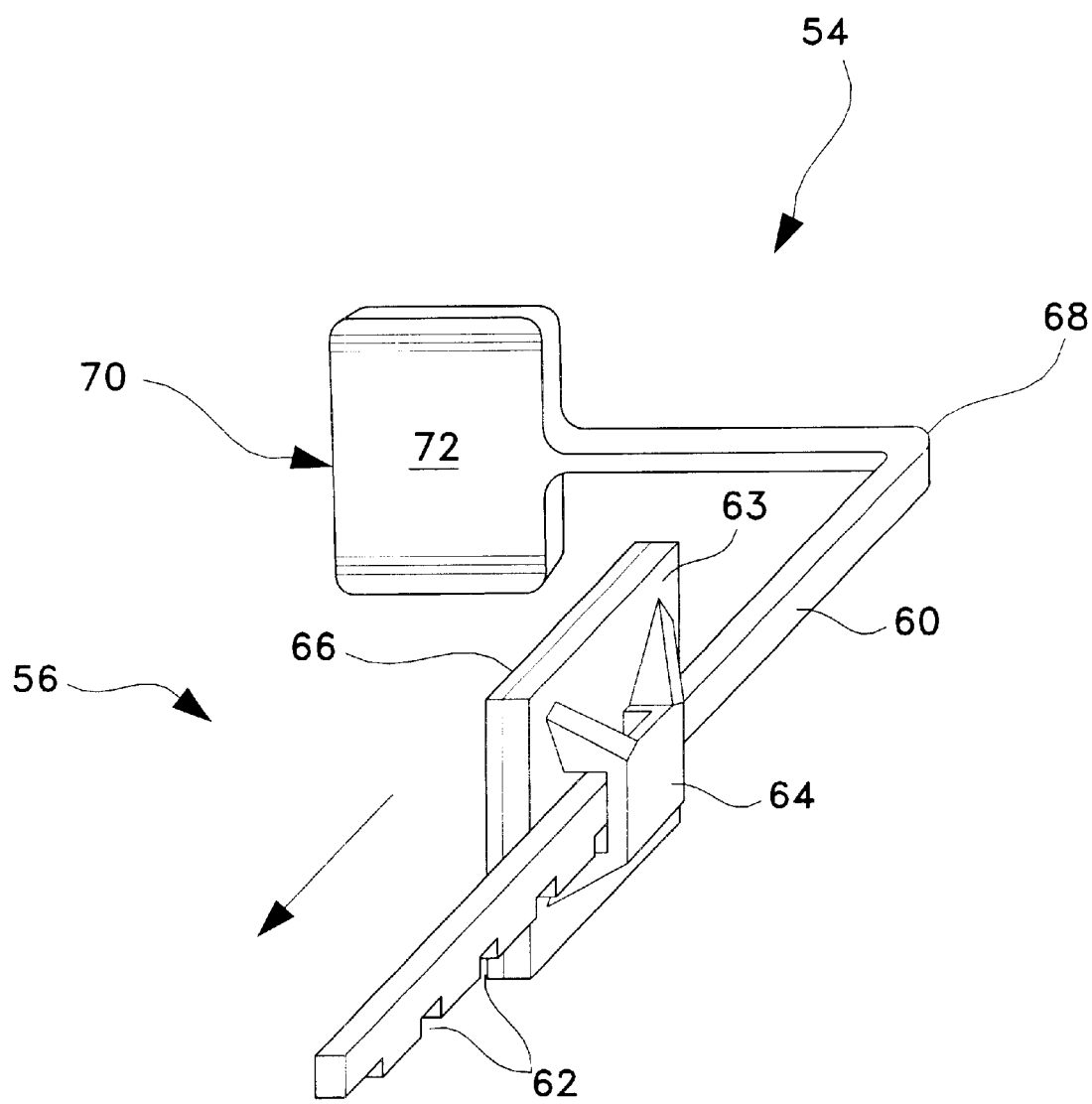
FIG. 5 is a perspective view of a stick-on bracket with an adjustable filter thickness feature for holding filters of different thicknesses onto the fan.
Figure 6:
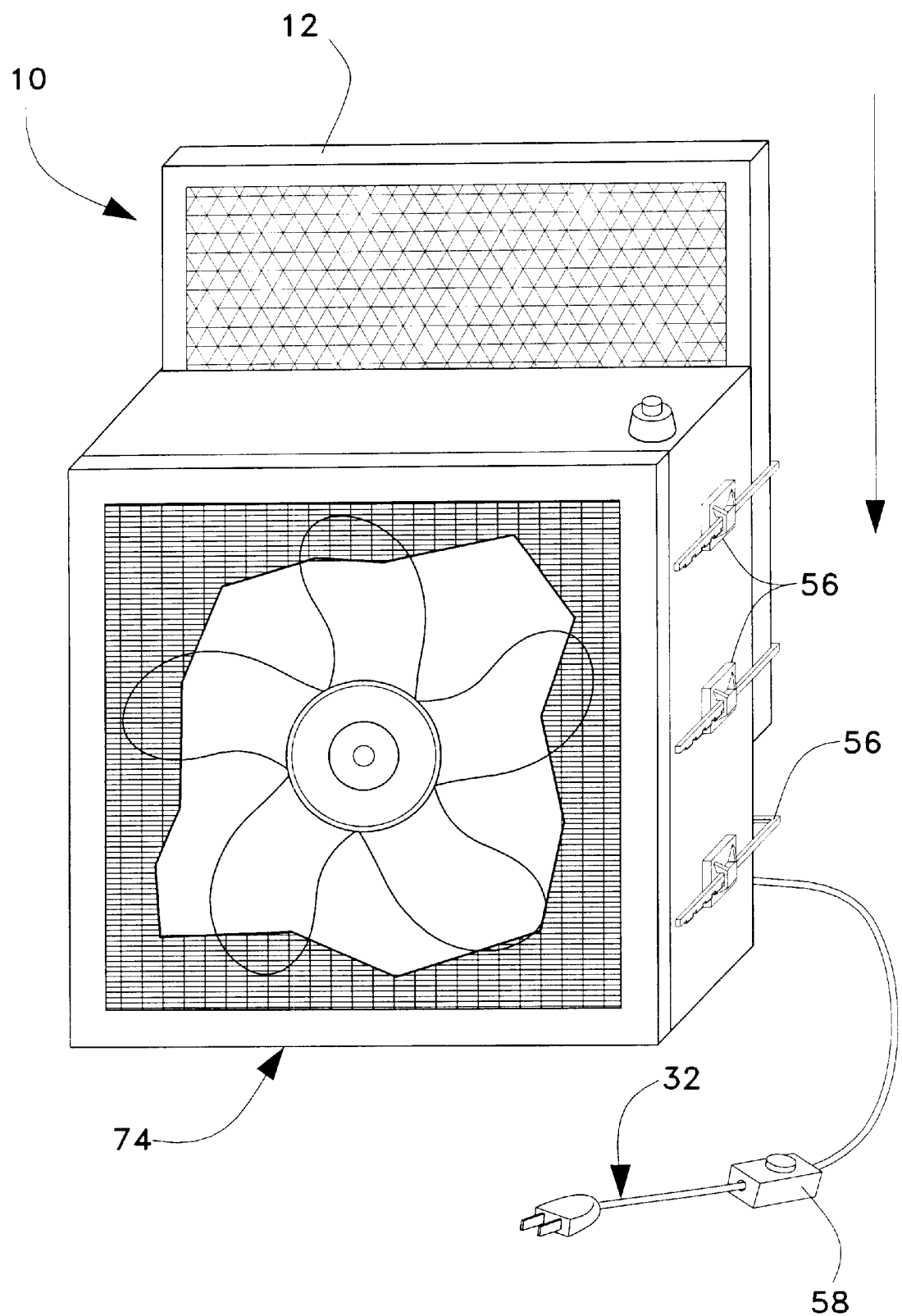
FIG. 6 is an environmental perspective view of a fan having a filter held by the stick-on brackets and a timer control installed in the fan's electric cord.

FIGS. 5 and 6 illustrate a fifth embodiment 54 of a filter attachment system, wherein a plurality of stick-on brackets 56 are applied to each side of a box fan 14, e.g., six, are used to hold the add-on filters 12, and a programmable timer control device 58 is attached to the fan's electric cord 32. The unique feature of the stick-on brackets 56 is the flexible adjustment of the extension of the bracket 56 by having an adjustable position clamp arm 60 with a series of shallow notches 62 which is slidable through and frictionally engages a boss 64 projecting from the rear face of a substantially flat, square base plate 63. The boss 64 is formed by four spaced apart, triangular wedge plates extending radially towards the corners of the base plate 63 with a small square plate joining the upper vertices of the triangular plates at the four corners of the small square plate. The arm 60 has a right-angled bend 68 and ends in a square pad portion 70. The base plate 63 has an adhesive coating, double-sided adhesive pad 66, or other means for adhesion to the fan 14 disposed on the front face of the base plate 63. The stick-on brackets 56 are preferably made from a thermoplastic material. In use, the base plates 66 of a plurality of brackets are adhered to the sides of the fan 14, a filter is placed between the pad portion 70 and the fan 14, and the arms 60 are moved inward to clamp the filter 12 against the fan.

If the fan 14 has clearance under its bottom surface 74 due to pads or feet, several more stick-on brackets 56 can be added at the bottom surface 74 for better securement of the filter 12. If a second filter 12 is to be attached to the front of the fan 14, similar brackets 56 can be utilized. The programmable timer control device 58 can be a 24 hour and 7 day time clock device for activating and deactivating the fan 14 at preselected times. The programmable timer 58 can be inserted inline with the cord 32 as shown, or may be built into the housing of the fan 14.

It is to be understood that the present invention is not limited to the embodiments described above, but encompasses any and all embodiments within the scope of the following claims.

We claim:

1. A fan filter system for square or round indoor fans which are electrically operated by an electrical line, comprising:

a fan having a housing with a front side, a right lateral side, a left lateral side, a rear side and a bottom side;

a plurality of brackets having an adjustable clearance, the brackets being attached to the right and left lateral sides adjacent the front or rear side of the housing, wherein each of said brackets comprises a base plate and a right-angled clamp arm having a first end slidable through said base plate and a second end having a square pad for clamping the filter against the fan; and a first filter inserted in said plurality of brackets.

2. The fan filter system according to claim 1, including a second filter attached to the side of the fan opposite the first filter.

3. The fan filter system according to claim 1, further comprising adhesive means for adhesive the base plate to the housing of the fan.

4. The fan filter system according to claim 1, wherein the housing further comprises a side pocket for insertion of an odorizing or deodorizing agent.

5. The fan filter system according to claim 1, further comprising a programmable 24 hour and 7 day timer connected to the fan for operating the fan for programmable periods of time.

6. The fan filter system according to claim 1, wherein the filter is a pre-pleated and pre-activated carbon filter.

7. The fan filter system according to claim 1, further comprising a plurality of right-angled adjustable brackets are disposed on the bottom side of the fan.

* * * * *